United States Patent
Liu et al.

(10) Patent No.: US 10,823,845 B2
(45) Date of Patent: Nov. 3, 2020

(54) SYSTEM AND METHOD FOR ROBUST SENSOR LOCALIZATION BASED ON EUCLIDEAN DISTANCE MATRIX

(71) Applicant: Mitsubishi Electric Research Laboratories, Inc., Cambridge, MA (US)

(72) Inventors: Dehong Liu, Lexington, MA (US); Hassan Mansour, Boston, MA (US); Petros Boufounos, Winchester, MA (US); Ulugbek Kamilov, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 235 days.

(21) Appl. No.: 16/016,614

(22) Filed: Jun. 24, 2018

(65) Prior Publication Data
US 2019/0391258 A1 Dec. 26, 2019

(51) Int. Cl.
*G01S 13/90* (2006.01)
*G01S 7/295* (2006.01)

(52) U.S. Cl.
CPC .......... *G01S 13/904* (2019.05); *G01S 7/295* (2013.01); *G01S 13/9064* (2019.05)

(58) Field of Classification Search
CPC ........ G01S 13/003; G01S 13/89; G01S 13/90; G01S 13/878; G01S 13/904; G01S 13/9064; G01S 7/295
See application file for complete search history.

(56) References Cited

U.S. PATENT DOCUMENTS

2018/0059237 A1* 3/2018 Liu .......................... G01S 13/89

OTHER PUBLICATIONS

Boyd "Distributed Optimization and Statistical Learning via Alternating Direction Method of Multipliers", Foundations and Trends in Machine Learning, vol. 3, No. 1, Jan. 1, 2010, pp. 1-122 (Year: 2010).*
Ivan "Euclidean Distance Matrices Essential theory algorithms and applications", in IEEE Signal Processing Magazine, vol. 32, No. 6, pp. 12-30, Nov. 2015 (Year: 2015).*
Boyd "Distributed Optimization and Statistical Learning via Alternating Direction of Multipliers", Foundations and Trends in Machine Learning, vol. 3, No. 1, Jan. 1, 2010, pp. 1-122 (Year: 2010).*

* cited by examiner

*Primary Examiner* — Vladimir Magloire
*Assistant Examiner* — Monark Sharma
(74) *Attorney, Agent, or Firm* — Gene Vinokur

(57) ABSTRACT

Systems and methods for radar systems to produce a radar image of a region of interest (ROI with targets. Sensors to transmit source signals to the ROI and to measure echoes reflected back from the targets corresponding to the transmitted source signals. A processor to calculate an estimate of a noisy and a partial Euclidean Distance Matrix (EDM) of the sensors and the targets. Decompose the noisy and the partial EDM into a low rank EDM that corresponds to locations to actual sensors and target locations, and a sparse matrix of distance errors, using a constrained optimization process. The low rank EDM is mapped into the sensors and the targets locations, to obtain estimated actual sensor locations. Implement an inverse imaging process using the estimated actual sensor locations and the received data, to produce the radar image to output to a communication channel.

20 Claims, 17 Drawing Sheets

FIG. 4D

*(Formation of Euclidean distance matrix (EDM))*

$$\min_{\{\tilde{r}_n\},\{t_k\}} f = \frac{\gamma}{2}\|(\Phi - \mathbf{E} - \mathbf{S}) \odot \mathbf{M}\|_F^2 +$$
$$|vec\{\mathbf{S}\odot\mathbf{M}\}|_1 + \frac{\sigma}{2}\sum_n \|\tilde{r}_n - r_n\|^2$$

s.t.  $\|\tilde{r}_n - \tilde{r}_{n+1}\| < \epsilon(\lambda)$, $\bar{\tilde{r}} \triangleq \frac{1}{N}\sum_n \tilde{r}_n = \frac{1}{N}\sum_n r_n \triangleq \bar{r}$, $\sum_n (\tilde{r}_n - \bar{\tilde{r}}) \times (r_n - \bar{r}) = 0$, $\mathbf{E} = [\|\tilde{r}_i - \tilde{r}_j\|^2]$   for $\forall i < N, \tilde{r}_i \triangleq t_{i-N}$ $\mathbf{E} \in \mathcal{R}^{(N+K)\times(N+K)}$

*(Constraint optimization problem of recovering Euclidean distance matrix)*

FIG. 5A

$$\min L(\mathbf{E}, \mathbf{S}, \{\tilde{r}_n\}, \{l_k\}, \{\mu_{ij}^e\}, \{\mu_n^e\}, \mu^c, \mu^o; z_n, \tilde{r}, o_{rt})$$

$$= \frac{\gamma}{2}\|(\boldsymbol{\Phi} - \mathbf{E} - \mathbf{S}) \odot \mathbf{M}\|_F^2 + |vec\{\mathbf{S} \odot \mathbf{M}\}|_1$$

$$+ \frac{\sigma^r}{2}\sum_n \|\tilde{r}_n - r_n\|^2 + (\|\tilde{r} - \frac{1}{N}\sum_n r_n\|^2) + \sigma_{rt}^2$$

$$+ \sum_{ij}\left(-\mu_{ij}^e(\mathbf{E}_{ij} - \|\tilde{r}_i - \tilde{r}_j\|^2) + \frac{\sigma_{ij}^e}{2}(\mathbf{E}_{ij} - \|\tilde{r}_i - \tilde{r}_j\|^2)^2\right)$$

$$+ \sum_n\left(-\mu_n^e(\|\tilde{r}_n - \tilde{r}_{n+1}\| + z_n - e) + \frac{\sigma_n^e}{2}(\|\tilde{r}_n - \tilde{r}_{n+1}\| + z_n - e)^2\right)$$

$$- \mu^c(\frac{1}{N}\sum_n \tilde{r}_n - \bar{r}) + \frac{\sigma^c}{2}(\frac{1}{N}\sum_n \tilde{r}_n - \bar{r})^2$$

$$- \mu^o\left(\sum_n(\tilde{r}_n - \bar{\tilde{r}}) \times (r_n - \bar{r}) - o_{rt}\right) + \frac{\sigma^o}{2}\left(\sum_n(\tilde{r}_n - \bar{\tilde{r}}) \times (r_n - \bar{r}) - o_{rt}\right)^2$$

*(Augmented objective function used in ADMM)*

FIG. 5B

*(Iterative updates)*

For $m = 1, \ldots, M$ $\mathbf{E}_m = \operatorname{argmin}_{\mathbf{E}} L(\mathbf{E}_{m-1}, \mathbf{S}_{m-1}, \{\tilde{r}_n\}_{m-1}, \{l_k\}_{m-1}, \{\mu_{ij}^e\}_{m-1})$ $\mathbf{S}_m = \operatorname{argmin}_{\mathbf{S}} L(\mathbf{E}_m, \mathbf{S}_{m-1})$ $\{\tilde{r}_n\}_m = \operatorname{argmin}_{\{\tilde{r}_n\}} L(\mathbf{E}_m, \mathbf{S}_m, \{\tilde{r}_n\}_{m-1}, \{l_k\}_{m-1}, \{\mu_{ij}^e\}_{m-1}, \{\mu_n^e\}_{m-1}, \{\mu_n^o\}_{m-1}, \{z_n\}_{m-1})$ $\{l_k\}_m = \operatorname{argmin}_{\{l_k\}} L(\mathbf{E}_m, \mathbf{S}_m, \{\tilde{r}_n\}_m, \{l_k\}_{m-1}, \{\mu_{ij}^e\}_{m-1}, \{\mu_n^e\}_{m-1}, \{\mu_n^o\}_{m-1}, \{z_n\}_{m-1})$ $\{z_n\}_m = max(\frac{\mu_n^e}{\sigma^e} - \|\tilde{r}_n - \tilde{r}_{n+1}\| + \epsilon, 0)$ $\{\bar{r}\}_m = \operatorname{argmin}_{\{\bar{r}_n\}} L(\{\tilde{r}_n\}_m, \bar{r})$ $\{o_{rt}\}_m = \operatorname{argmin}_{\{o_{rt}\}} L(\{\tilde{r}_n\}_m, o_{rt})$ $\mu_{ij}^e \leftarrow \mu_{ij}^e - \sigma_{ij}^e (\mathbf{E}_{ij} - \|\tilde{r}_i - \tilde{r}_j\|^2)$ $\mu_n^e \leftarrow \mu_n^e - \sigma_n^e(\|\tilde{r}_n - \tilde{r}_{n+1}\| + z_n - \epsilon)$ $\mu^c \leftarrow \mu^c - \sigma^c(\frac{1}{N}\sum_n \tilde{r}_n - \bar{r})$ $\mu^o \leftarrow \mu^o - \sigma^o\left(\sum_n (\tilde{r}_n - \bar{r}) \times (\tilde{r}_n - \bar{r}) - o_{rt}\right)$

*(Iterative updates of ADMM)*

FIG. 5C

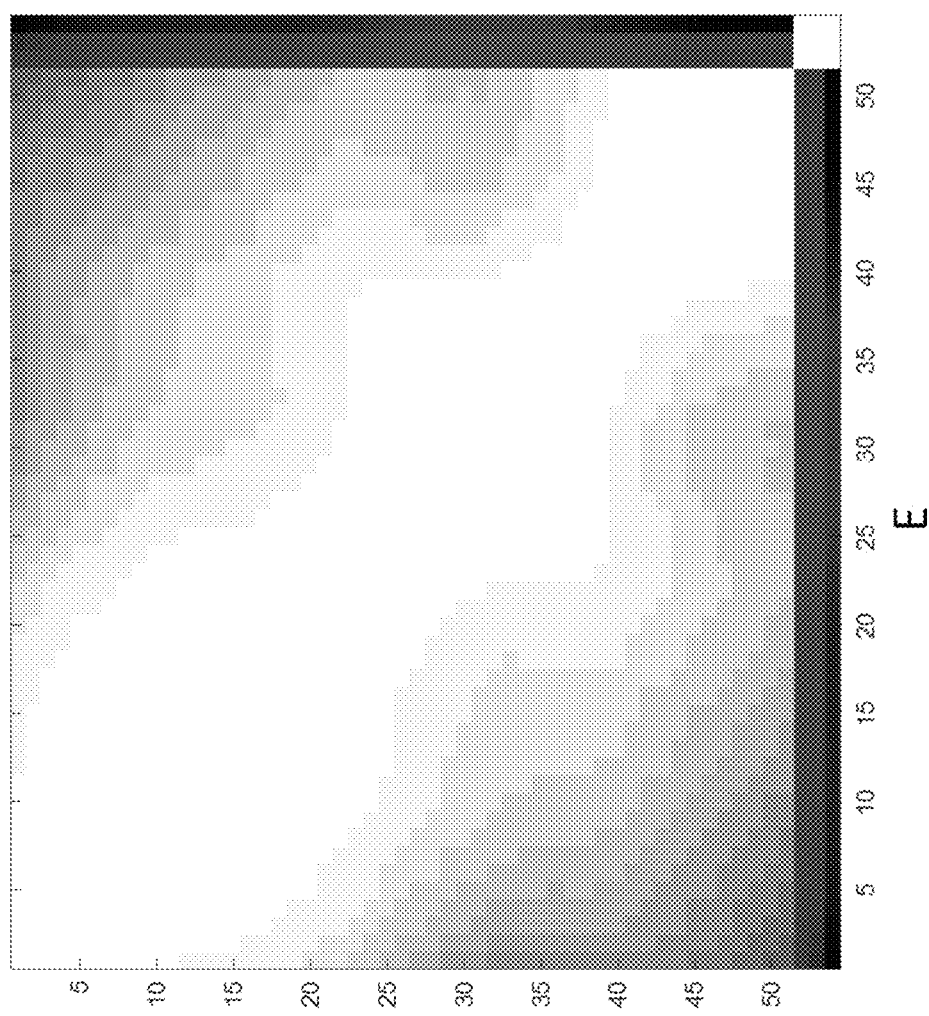
FIG. 5E  (Examples of recovered EDM)

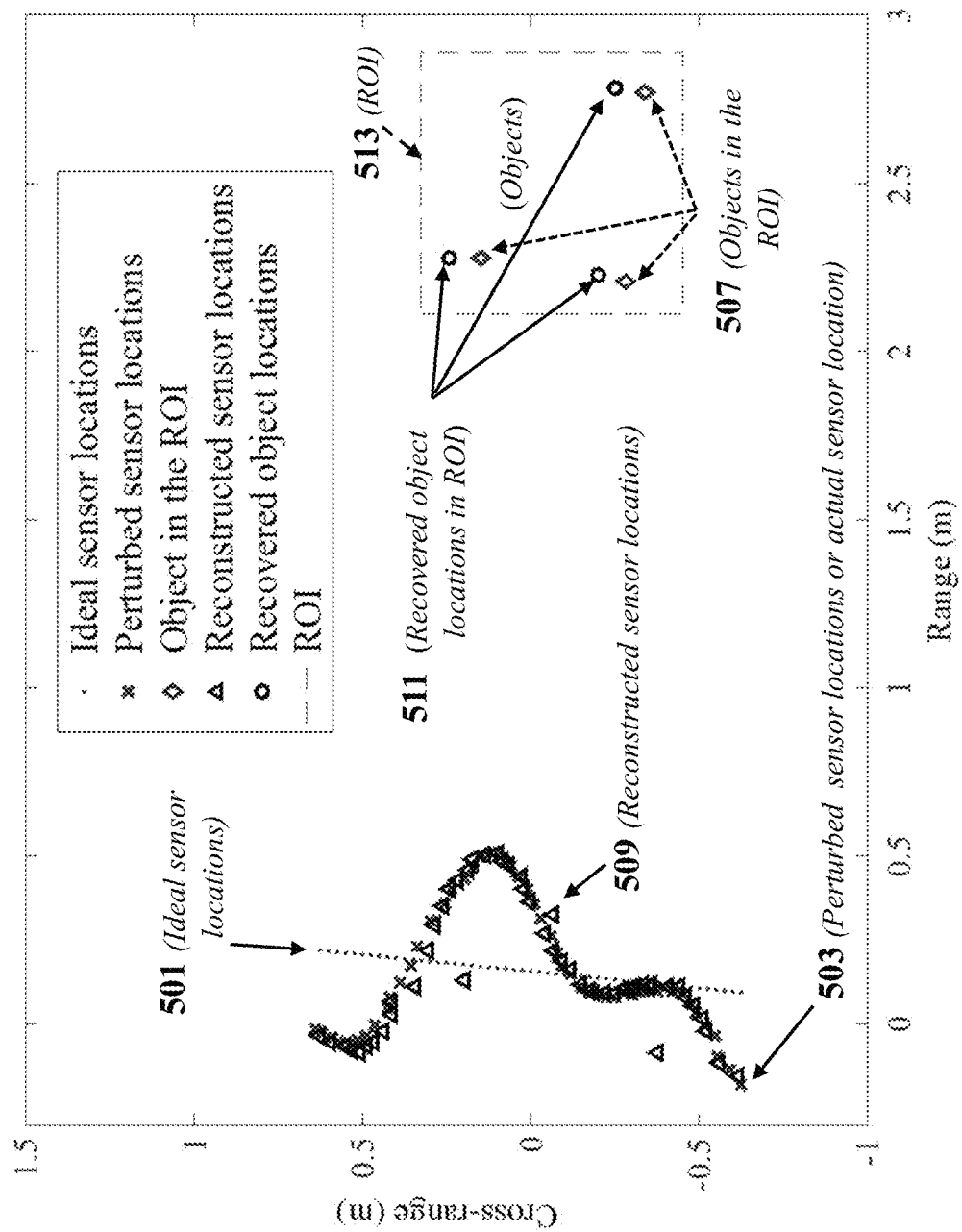
FIG. 5H *(Example results of sensor localization)*

(Example results of imaging using inaccurate sensor locations and estimated sensor locations)

SYSTEM AND METHOD FOR ROBUST SENSOR LOCALIZATION BASED ON EUCLIDEAN DISTANCE MATRIX

FIELD

The present disclosure relates generally to distributed sensing systems, and more particularly radar imaging using distributed sensors with not well calibrated positions or moving sensors under unknown position perturbations.

BACKGROUND

In conventional remote sensing systems, sensor locations play a crucial role in the imaging process. When the sensor locations are exactly known, the phase change of data recorded by sensors can generally be well compensated at locations of scattering object, i.e target, during inverse imaging process, yielding focused images of the objects. However, in practice sensor locations may not be well calibrated, especially for conventional systems such as distributed sensor systems or moving sensor platforms such as airborne or vehicle mounted radar systems. Any location error, even much smaller than the central wavelength, may lead to out-of-focus imaging results. While location errors increase to several wavelengths large, the imaging results may fail to focus at objects, even those strong scattering objects.

Therefore, for radar imaging systems and methods for distributed arrays it is necessary to accurately locate the sensor positions in order to realize focused imaging.

Auto-focus has been a challenging problem in remote sensing using different sensor modalities. Conventional location or motion compensation based methods seek to compensate sensor location errors such that different location-induced phase errors can be corrected. If the sensor location errors are much smaller than the source wavelength, the location-induced out-of-focus problem may be solved by sparsity-driven auto-focus algorithms, which model the auto-focus imaging problem as an optimization problem with a perturbed projection matrix and a constraint on the sparsity of reconstructed image. The resulting solution, however, includes an error that is related to the location mismatch. A global optimal solution is only achievable when location errors are much smaller than the central frequency wavelength and with a good initialization. When location errors are greater than the wavelength, this method may not converge to a focused imaging result.

SUMMARY

Embodiments of the present disclosure relate to systems and methods for radar imaging using distributed sensors or moving sensors that generate focused images in order to compensate for unknown position perturbations or for sensors with poorly calibrated positions.

Some embodiments of the present disclosure relate to systems and methods for radar imaging using moving sensors for detecting targets in a region of interest (ROI), where the sensors are perturbed with location errors.

The present disclosure provides robust estimation of sensor locations for radar imaging systems, based on low-rank Euclidean distance matrix (EDM) reconstruction. To this end, a square matrix of EDM is defined as follows. Each row of the EDM corresponds to either a sensor or an object, and each column corresponds to a sensor or an object in the same order. Each entry of the EDM is a squared distance between the corresponding row sensor/object and the corresponding column sensor/object. The entries of the EDM are partially initialized by inaccurate squared distances of two sensor locations, accurate squared distances between a sensor and an object but likely with a wrong corresponding object, and unknown distances between two of the objects to be imaged. Wherein, the initial EDM is treated as a noisy version of the actual EDM and with missing entries. Then it is possible to decompose the noisy EDM with missing entries into a low-rank EDM corresponding to actual sensor locations and a sparse matrix of distance errors by solving a constrained optimization problem using the alternating direction method of multipliers (ADMM).

Specifically, some embodiments of the present disclosure provide for location estimation that solves sensor localization problems in autofocus imaging, especially for over-wavelength location errors. To this end, a noisy EDM of sensors and targets/objects under detection is partially initialized as follows, by non-limiting example. Distances between the sensors can be estimated using the ideal or approximate sensor locations using other side information such as GPS information, distances between the sensors and the targets/objects are estimated by analyzing the correlation of received signal data, and distances between the targets/objects remain unknown, since there is no straightforward information to estimate them. Learned from experimentation, is that estimated distances between sensors are with errors depending on the level of sensor perturbations. While distances between sensors and targets/objects are generally accurate when the signal-to-noise ratio is high. However, also learned from experimentation, is that in some cases the distance between a sensor to one target/object may be treated as the distance between the sensor to another target/object, causing a spike error in the EDM matrix. Based on knowing this spike error, at least one objective is then to recover the underlying low-rank EDM from this noisy distance matrix with missing entries. In order to accomplish this task, the present disclosure employs an ADMM process to decompose the noisy EDM into two parts, one is a low rank EDM corresponding to the true sensor and scattering target/object locations, and the other is the sparse part corresponding to the location errors.

Also learned during experimentation, is that if the sensor location errors are much smaller than the source wavelength, then the position-induced out-of-focus problem may be solved by sparsity-based auto-focus algorithms which model the auto-focus imaging problem as an optimization problem with a sparse image assumption and a perturbed projection matrix. Wherein the resulting solution, however, includes an error that is related to the position mismatch. Further, learned from experimentation is that a global optimal solution is only achievable when the position error is much smaller than the central frequency wavelength and with a good initialization. When the position errors are in the order of several wavelengths, this approach may not converge to a focused imaging result.

In order to localize sensors, the EDM of sensors can be utilized to map distances between sensors into coordinates of sensors as discovered from experimentation. According to our understanding through experimentation, the theory of EDM, an EDM of any points of interest in the d-dimensional space has a rank of at most d+2. Given the EDM of sensors, sensor locations can be determined neglecting the rotation, translation and reflection of sensors. From experimentation, this EDM is however not fully observable and noisy, which consequently resulted in wrong estimations of sensor locations as evidenced from several experiments. Based on such findings, at least one goal of the present disclosure is to overcome this problem by using a robust method dealing with missing and noisy EDM.

Regarding noisy EDM formation, some embodiments of the present disclosure consider a 2-D array imaging problem in which a mono-static radar is moving along a predesigned trajectory to detect K static targets/objects situated in a ROI. For this approach, the trajectory is assumed to be a straight line and the radar acts as a virtual uniform linear array of N sensors. In order to accurately locate sensors, each sensor and each target/object in the ROI is treated as a point of interest to build an EDM of them. As noted above, the idea is that this approach first builds a noisy and incomplete EDM according to measurements and prior information about the sensors. Then, a low-rank EDM is recoved based on this noisy EDM, where the low-rank EDM is determined, and that the sensor locations as well as the target/object locations can be explored accordingly given a reference point. Since there is no clear information about the target/object locations so far, the corresponding distances remain unknown, meaning the estimated EDM is only partially observed.

Regarding a robust EDM analysis, some embodiments of the present disclosure address solving the relative distances between sensors and targets/objects making a computation of using the measurements corresponding to each sensor via data correlation analysis, leaving the distances between targets/objects undetermined. Due to the local optimality problem of the correlation function, the estimated EDM may include spike errors caused by mis-alignment of objects as well as approximation errors, as noted above. These errors may consequently result in wrong sensor locations in the resulting EDM to sensor location mapping.

Based on experimentation with Robust Principle Component Analysis (RPCA) processes with missing data, some embodiments of the present disclosure employ an alternating direction method of multipliers (ADMM) approach to decompose the noisy EDM into two parts, one is a low rank EDM corresponding to the true sensor and scattering object locations, the other is the sparse part corresponding to the position errors, as noted above. The recovered low rank EDM can be mapped into sensor and scattering target/object locations. Simulation results demonstrate that our method can accurately estimate both sensor and target locations.

Because of the above realizations discovered during experimentation, embodiments of the present disclosure are able to reconstruct a low-rank Euclidean distance matrix (EDM) of true or actual perturbed sensor locations from a noisy EDM estimate with missing entries using the ADMM approach. Experimental results demonstrate that these embodiments significantly improved the performance in localizing sensors of moving platforms compared to other conventional localization sensor methods, by providing, by non-limited example, sharp images of targets/objects situated in the ROI.

According to an embodiment of the present disclosure, a radar system to produce a radar image of a region of interest (ROI), wherein the ROI includes targets. The radar system including sensors at different positions to transmit source signals to the ROI and to measure echoes reflected back from the targets corresponding to the transmitted source signals. Wherein each sensor includes received signal data including echoes of target measurements specific to the sensor. A hardware processor to calculate an estimate of a noisy and a partial observed EDM of the sensors and the targets, based on the received signal data. Wherein Euclidean distances between the sensors are computed using expected sensor locations and the Euclidean distances between the sensors and the targets are estimated by correlating the received signal data with the transmitted source signal for each sensor. Wherein the noisy and the partial EDM includes distance errors. Decompose the noisy and the partial EDM into a low rank EDM that corresponds to locations of actual sensors and target locations, and a sparse matrix of distance errors, using a constrained optimization process. Wherein the low rank EDM is mapped into the sensors and the targets locations, to obtain estimated actual sensor locations. Implement an inverse imaging process using the estimated actual sensor locations and the received signal data, to produce the radar image. An output interface to output the radar image to a communication channel.

According to another embodiment of the present disclosure, a method for producing a radar image of a region of interest (ROI), wherein the ROI includes targets. The method including acquiring echoes reflected back from targets in the ROI corresponding to transmitted source signals from sensors at different positions. Wherein each sensor includes received signal data including echoes of target measurements specific to the sensor. Using a hardware processor for calculating an estimate of a noisy and a partial EDM of the sensors and the targets, based on the received signal data. Wherein Euclidean distances between the sensors are computed using expected sensor locations and the Euclidean distances between the sensors and the targets are estimated by correlating the received signal data for each sensor. Wherein the noisy and the partial EDM includes distance errors. Decomposing the noisy and the partial EDM into a low rank EDM that corresponds to locations to actual sensors and target locations, and a sparse matrix of distance errors, using a constrained optimization process. Wherein the low rank EDM is mapped into the sensors and the targets locations, to obtain estimated actual sensor locations. Implementing an inverse imaging process using the estimated actual sensor locations and the received signal data, to produce the radar image. Outputting via an output interface the radar image to a communication channel.

According to another embodiment of the present disclosure, a method a non-transitory computer readable storage medium embodied thereon a program executable by a processor for performing a method. The method acquiring a set of echoes reflected back from targets in the ROI corresponding to transmitted source signals from a set of sensors at different positions. Wherein each sensor includes received signal data including echoes of target measurements specific to the sensor. Providing a hardware processor for calculating an estimate of a noisy and a partial Euclidean Distance Matrix (EDM) of the sensors and the targets, based on the received signal data. Wherein Euclidean distances between the sensors are computed using expected sensor locations and the Euclidean distances between the sensors and the targets are estimated by correlating the received signal data for each sensor. Wherein the noisy and the partial EDM includes distance errors. Decomposing the noisy and the partial EDM into a low rank EDM that corresponds to locations to actual sensors and target locations, and a sparse matrix of distance errors, using a constrained optimization process. Wherein the low rank EDM is mapped into the set of sensors and the targets locations, to obtain estimated actual sensor locations. Implementing an inverse imaging process using the estimated actual sensor locations and the received signal data, to produce the radar image. Outputting via an output interface the radar image to a communication channel, so as to provide a focused radar image in order to obtain information from the radar image.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 4D is schematic illustrating of different areas of Euclidean distance matrix, according to the embodiments of the present disclosure;

FIG. 5A is a constraint optimization function of recovering Euclidean distance matrix of sensors and objects, according to the embodiments of the present disclosure;

FIG. 5B is an augmented objective function for ADMM, according to the embodiments of the present disclosure;

FIG. 5C is schematic illustrating of iterative updates of ADMM, minimizing the augmented objective funtion, according to the embodiments of the present disclosure;

FIG. 5E is schematic illustrating of recovered EDM using ADMM, according to the embodiments of the present disclosure;

FIG. 5H is schematic illustrating of recovered sensor locations using a least squares method, which is compared to the method of FIG. 5G, according to the embodiments of the present disclosure;

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Figure 1:
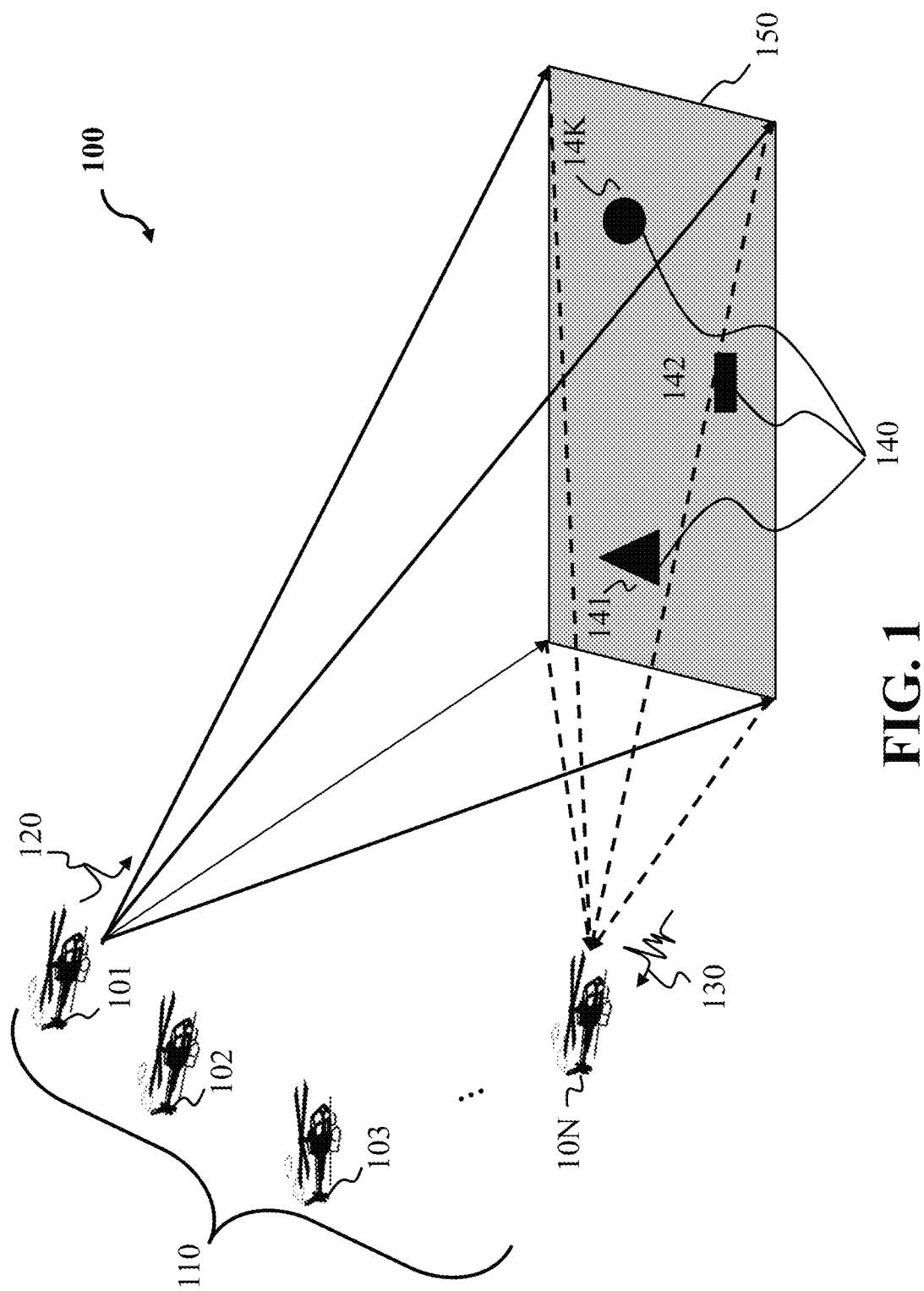
FIG. 1 is a schematic illustrating a distributed radar imaging system having moving sensors for detecting targets/objects in a Region of Interest (ROI), according to embodiments of the present disclosure.

FIG. 1 is a schematic illustrating a distributed moving radar imaging system 100 having moving sensors 110 for detecting a group of targets/objects 140 in a Region of Interest (ROI) 150, according to embodiments of the present disclosure. The group of targets 140, includes K targets 141, 142 and 14K. The distributed radar imaging system 110, can be sensors for an airborne platform or vehicle mounted platform, etc, that include at least one moving transmit/receive platform or transmitter/receiver 101, and a set of N distributed moving similar receiver platforms or receivers 101, 102, 103, 10N. It is contemplated that the set of N distributed receivers may be five or more, 10 or more or 20 or more. Radar pulses 120 are transmitted from the aleast one transmitter/receiver 101, to illuminate targets 140 situated in an area of interest or region of interest (ROI) 150, and the corresponding reflected radar reflections 130 are recorded by the multiple distributed receivers 101, 102, 103, and 10N. The reflections 130 can be characterized as a weighted combination of delayed pulses, where complex weights depend on specific target reflectivities and antenna patterns. Given the pulses and reflections, radar images can be generated in a range-azimuth plane according to corresponding weights and delays. The azimuth resolution of the radar images depends on a size of an array aperture, and a range resolution depends on a bandwidth of the pulses.

Figure 2:
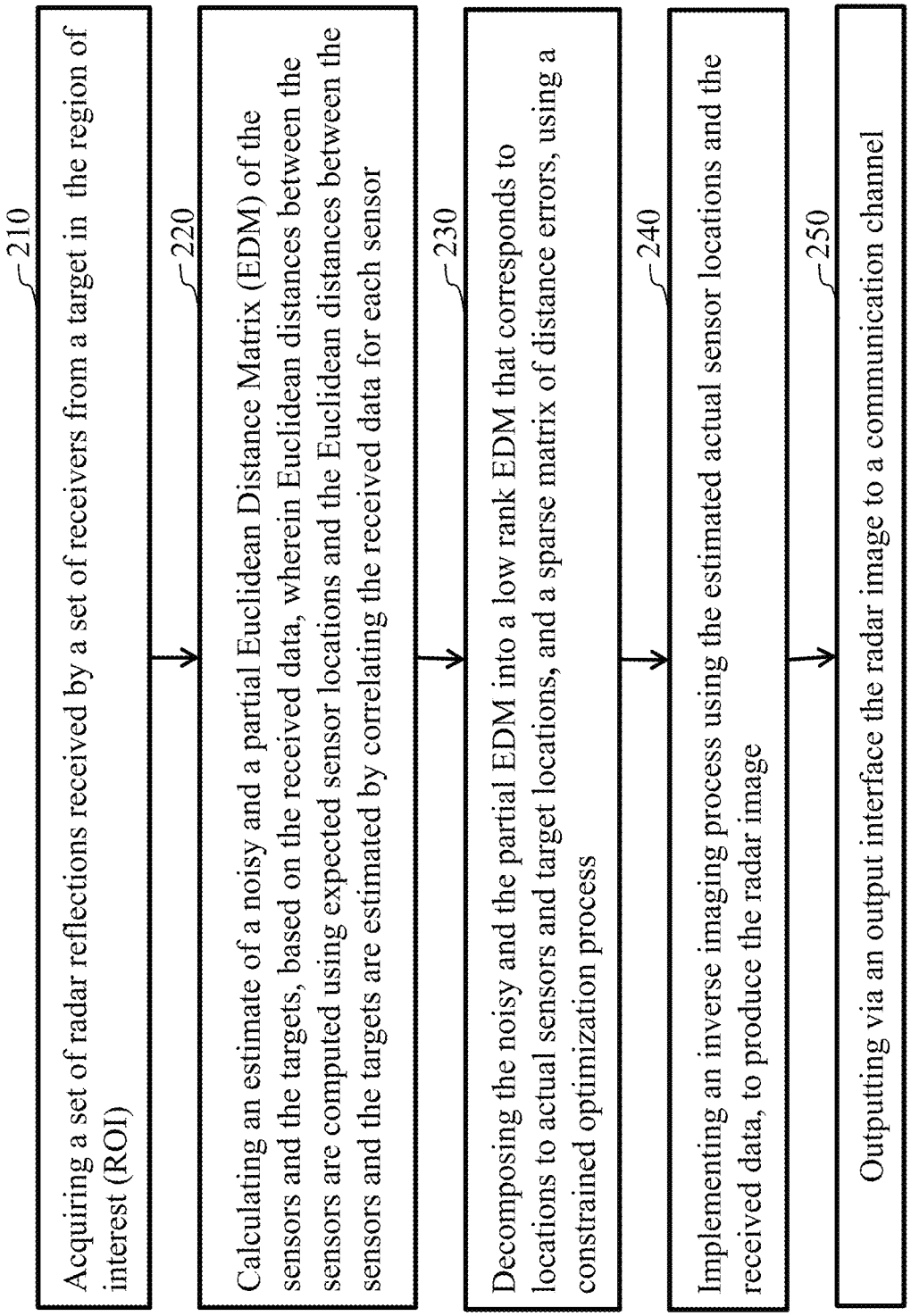
FIG. 2 is a block diagram illustrating steps of a method, according to embodiments of the present disclosure.

FIG. 2 is a block diagram illustrating steps of a method, according to embodiments of the present disclosure. The method includes step 210 of acquiring a set of radar reflections received by a set of receivers from a target in the region of interest (ROI). The set of radar reflections correspond to a transmitted radar signal from a transmitter directed toward the ROI. The set of radar reflections or reflections can be stored in a memory of a processor for each receiver and communicated to a central controller for processing.

Step 220 of FIG. 2 includes calculating an estimate of a noisy and a partial Euclidean Distance Matrix (EDM) of the sensors and the targets, based on the received signal data. Wherein Euclidean distances between the sensors are computed using expected sensor locations and the Euclidean distances between the sensors and the targets are estimated by correlating the received signal data for each sensor. The coarse positions of the set of sensors are given by real-time GPS signals or by pre-designed stationary positions or moving trajectories. The sensors can be stationary or moving along a pre-designed trajectory.

Step 230 of FIG. 2 includes decomposing the noisy and the partial EDM into a low rank EDM that corresponds to locations to actual sensors and target locations, and a sparse matrix of distance errors, using a constrained optimization process.

Step 240 of FIG. 2 includes implementing an inverse imaging process using the estimated actual sensor locations and the received signal data, to produce the radar image.

Step 250 of FIG. 2 includes outputting via an output interface the radar image to a communication channel.

Figure 3:
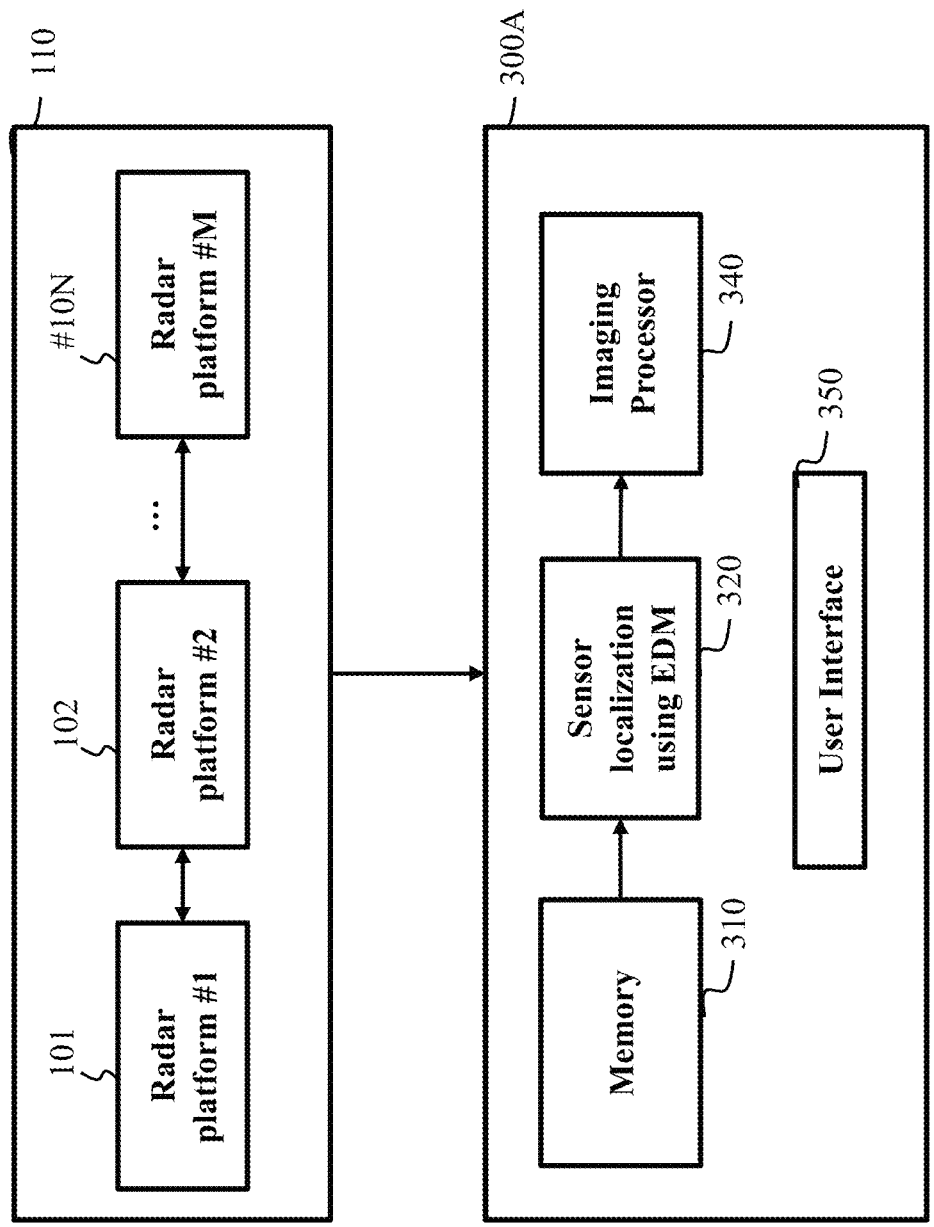
FIG. 3 is a block diagram of a computer system of the distributed radar imaging system showing synchronized radar platforms that communicate to each other, according to embodiments of the present disclosure.

FIG. 3 is a block diagram of a computer system of the method showing synchronized sensor platforms 110, which includes sensor platform or radar platform number 1, 101, sensor platform or radar platform number 2, 102, sensor platform or radar platform number 3, 10N, that communicate to each other and store collected data in a memory 310 of a computer 300A. The computer 300A includes a sensor localization using EDM 320 for processing the collected data, wherein the output of sensor locations and collected data are an input to an imaging processor 340, according to embodiments of the present disclosure. Further, the computer 300A includes a user interface 350.

Figure 4A:
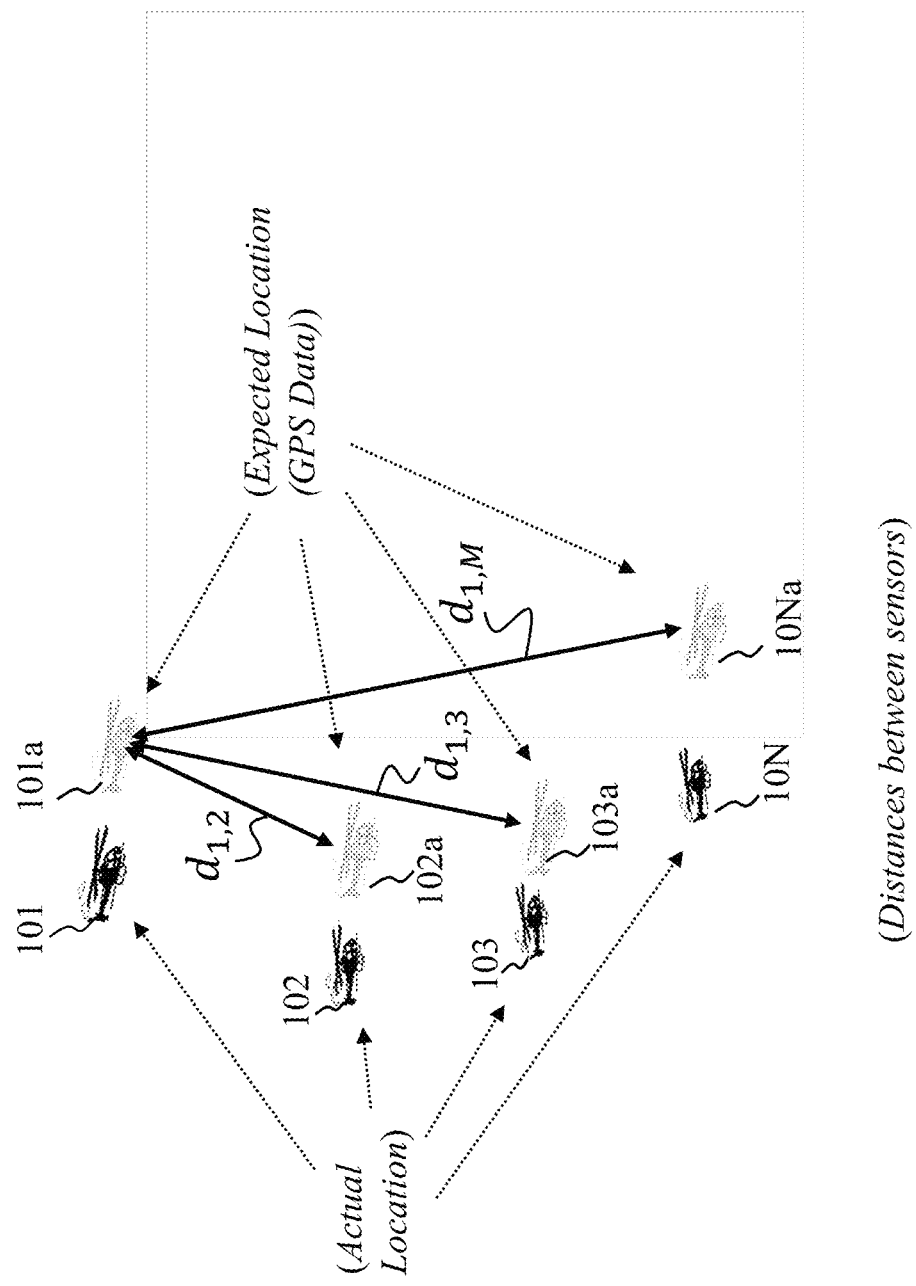
FIG. 4A is schematic illustrating of determining the distances from an antenna (sensor) to all other antennas, according to the embodiments of the present disclosure.

FIG. 4A is schematic illustrating of determining the distances from an antenna (sensor) to all other antennas, according to the embodiments of the present disclosure. For example, consider a collection of N points $\{x_1, x_2, \ldots, x_N\}$ in the d-dimensional Euclidean space, where $x_i \in \mathcal{R}^d$. The quared Eulideandistance between $x_i$ and $x_j$ is given by $$\|x_i-x_j\|^2 = x_i^T x_i - 2x_i^T x_j + x_j^T x_j. \quad (1)$$

The corresponding Euclidean distance matrix (EDM) of $\{x_i\}_i = 1, \ldots, N$ is defined as $$E = [\|x_i - x_j\|^2] \quad (2)$$
$$= 1\text{diag}(X^T X)^T - 2X^T X + \text{diag}(X^T X)1^T,$$

Where $X = [x_1, x_2, \ldots, x_N] \in \mathcal{R}^{d \times N}$, this shows that the EDM is the sum of three matrices, which are of rank 1, d, and 1 repectively. Therefore, the rank of the EDM is at most d+2. For 2-D or 3-D imaging problems, the rank is at most 4 (for d=2) or 5 (for d=3), respectively, regardless how many sensors are included in X. Further demonstrated is that any translation, rotation, or reflection transform of X will lead to the same EDM. Therefore, given an EDM, there is no unique solution for the point coordinates. However, given a reference point, a possible solution can be achieved by the following process according to embodiments of the present disclosure. Let $x_1 = 0$ be the origin, and e1 be the first column of E. The Grain matrix of X can be computed using EDM as $$G = X^T X = -\tfrac{1}{2}(E - 1e_1^T - e_1 1^T). \quad (3)$$

Using the singular value decomposition (SVD)

$$G = U^T \Lambda U, \quad (4)$$

Where $$\Lambda \text{diag}(\lambda_1, \ldots \lambda_N), \quad (5)$$

with eigenvalues sorted in the order of decreasing magnitude, we can reconstruct a point set $\hat{X}$ from the original EDM as follows $$\hat{X} = [\text{diag}(\sqrt{\lambda_1}, \ldots, \sqrt{\lambda_d}, 0_{d \times (N-d)}]U^T. \quad (6)$$

Regarding FIG. 4A and FIG. 1, a first approach is to use an array imaging problem in which a distributed radar system of M sensors/platforms/antennas 101, 102, ..., 10N, are used to detect K static objects 141, 142, ..., 14K situated in a region of interest (ROI) 150. In order to accurately locate the sensors 101, 102, 103 ..., 10N, each sensor and each object in the ROI is treated as a point of interest to build an EDM of them. The idea of this approach is to first build a noisy and incomplete EDM according to measurements and prior information about the sensors. Then, recover a low-rank EDM based on this noisy EDM, upon the low-rank EDM being determined, the sensor locations, as well as the object locations can be explored accordingly given a reference point.

Still referring to FIG. 4A and FIG. 1, for example, let $P(\omega_m)$ be the frequency-domain source signal 120 emitted by the mono-static radar 101. The signal 130 received by radar sensor located at the $n^{th}$ perturbed location ern can be modeled as a superposition of radar echoes of all objects in the area of interest as follows $$Y(\omega_m, \tilde{r}_n) = \sum_{k=1}^{K} P(\omega_m) S(\omega_m, l_k) e^{-j\omega_m \frac{2\|\tilde{r}_n - l_k\|}{c}}, \quad (7)$$

where $S(\omega_m, l_k)$ is the equivalent complex-valued impulse response of the object at location $l_k$, and $$e^{-j\omega_m \frac{2\|\tilde{r}_n - l_k\|}{c}}$$

presents the phase change of received radar echo relative to the radar source signal after propagating a distance of $2\|\tilde{r}_n - l_k\|$ at speed c.

By letting $\Phi \in \mathcal{R}^{(N+K) \times (N+K)}$ be the noisy EDM of sensors and objects, it is possible to estimate its entries using the following process.

Still referring to FIG. 4A, first, the Euclidean distance between sensors 101, 102, 103 ..., 10N can be estimated using the expected sensor locations 101a, 102a, ..., 10Na, which are either pre-designed or provided by GPS data as $$\phi_{n_1, n_2} = \|r_{n_1} - r_{n_2}\|^2, \text{ for } 0 < n_1, n_2 < N. \quad (8)$$

Figure 4B:
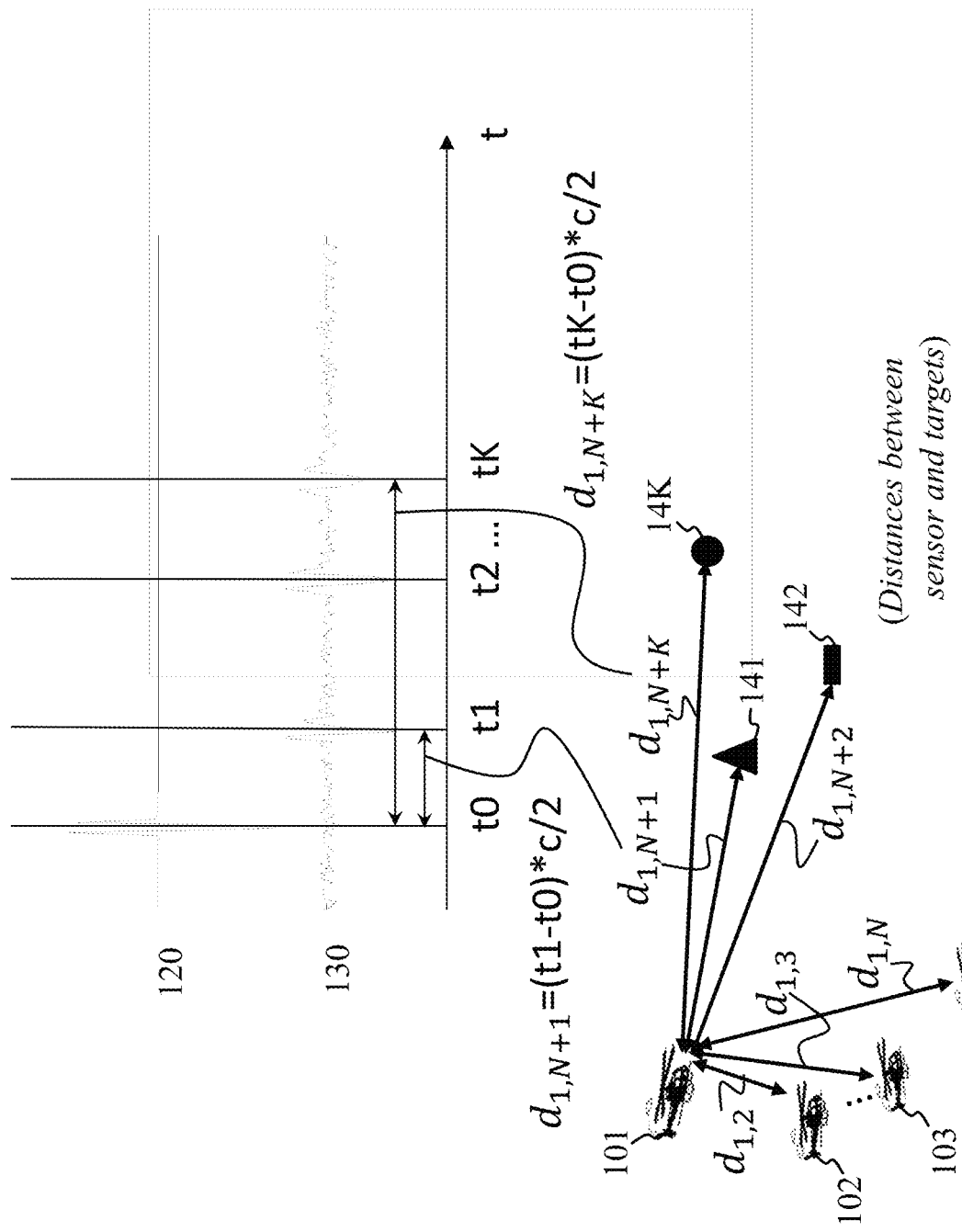
FIG. 4B is schematic illustrating of determining the distances from an antenna (sensor) to all objects, according to the embodiments of the present disclosure.

FIG. 4B is schematic illustrating of determining the distances from an antenna (sensor) to all objects, according to the embodiments of the present disclosure.

Referring to FIG. 4A and FIG. 4B, second, according to Eq. (7), the phase change of received echo relative to the transmitted source signal reflects the distance between the sensor and the corresponding object. For a wide-band source signal, the phase change is characterized by a time shift between the source signal and received signal. This time shift can be effectively estimated by computing the cross-correlation (CC) between the two time-domain signals or computed equivalently in the frequency domain. The maximum of the crosscorrelation function indicates the point in time where the signals are best aligned, see FIG. 4B, i.e., $$\tilde{\tau}_{n,k} = \text{argmax}_\tau \int y(t, \tilde{r}_n, l_k) \cdot p(t+\tau) dt \quad (9)$$
$$= \text{argmax}_\tau \mathcal{F}^{-1}\{(\tilde{y}_{nk}(-j\omega t))^* \odot p(-j\omega(t+\tau))\}$$

where $\odot$ represents element-wised product. The $(n, N+k)^{th}$ entry of $\Phi$ is estimated by $$\phi_n, N+k = \left(\frac{\tilde{\tau}_{n,k} \cdot c}{2}\right)^2 \quad (10)$$

Figure 4C:
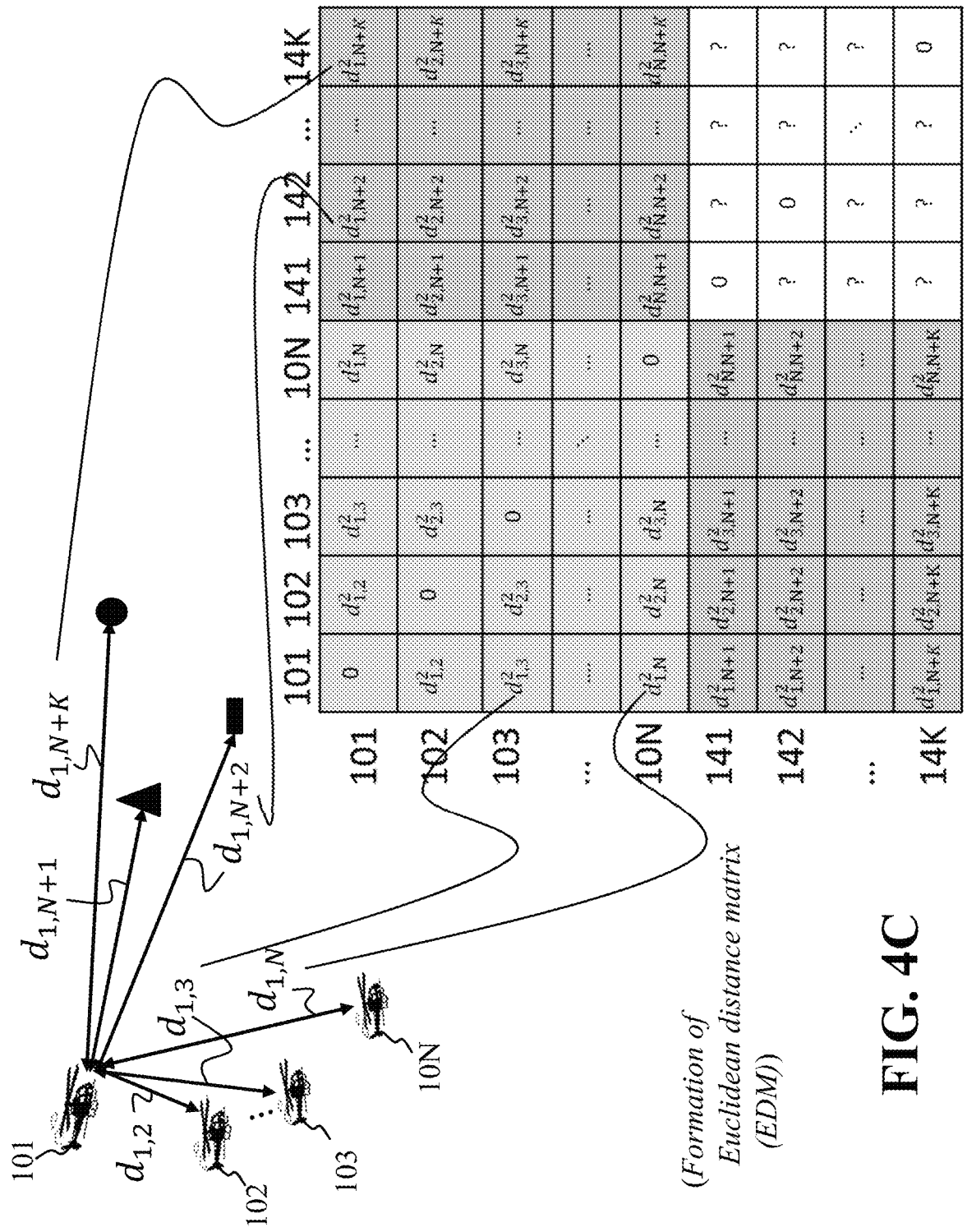
FIG. 4C is schematic illustrating of formation of partial observed noisy Euclidean distance matrix, according to the embodiments of the present disclosure.
Figure 4D:
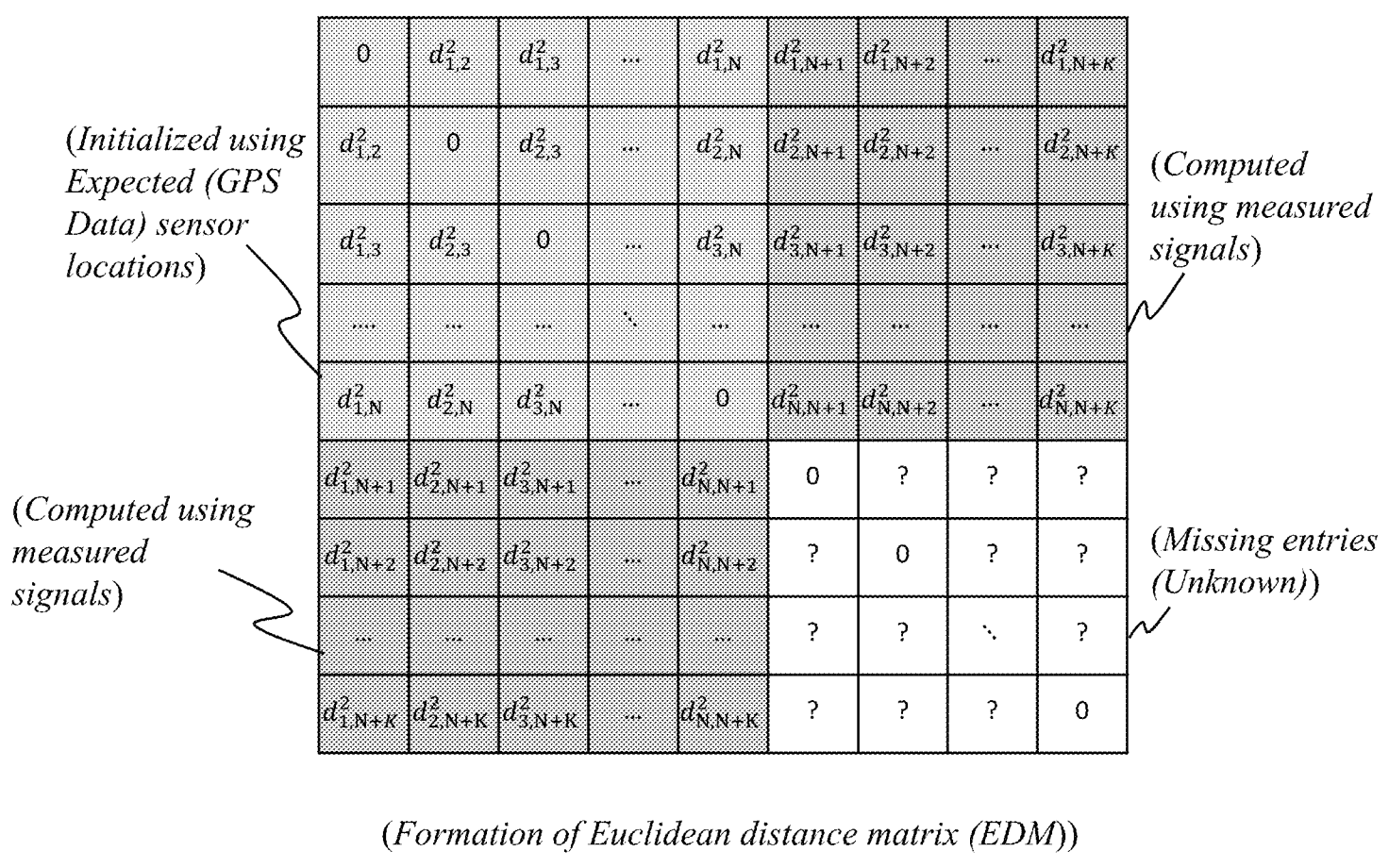

FIG. 4C is schematic illustrating of formation of partial observed noisy Euclidean distance matrix, according to the embodiments of the present disclosure. FIG. 4D is schematic illustrating of different areas of Euclidean distance matrix, according to the embodiments of the present disclosure.

Referring to FIG. 1, FIG. 4B, FIG. 4C and FIG. 4D, based on Eq. (8) and Eq. (10), the initial EDM can be formulated as shown in FIG. 4C. Since there is no clear information about the object locations so far, the corresponding distances remain unknown, meaning the estimated EDM is only partially observed, see FIG. 4D. In addition, as Eq. (8) is generally not concave, multiple local maxima may exist, potentially causing spike errors in the estimated EDM. All these issues will be tackled in our robust sensor localization method.

Still referring to FIG. 4C and FIG. 4D, the robust principal component analysis (RPCA) method aims to solve the following problem. Given $\Phi = E + S$ where E and S are unknown, but E is known to be low rank and S is known to be sparse, recover E and S. In this case, $\Phi$ is partially estimated using measurements and prior information of sensor locations. At least one objective is then to recover the underlying low rank E, which is defined as $$E = [\|x_i - x_j\|^2], \quad (11)$$

where $\forall x_p, x_j \in \{\tilde{r}_1, \ldots, \tilde{r}_N, l_1, \ldots, l_K\}$.

FIG. 5A is a constraint optimization function of recovering Euclidean distance matrix of sensors and objects, according to the embodiments of the present disclosure. In order to solve this problem, an approach of the present disclosure is to minimize a constrained cost function for robust sensor localization based on EDM $$\min_{\{\tilde{r}_n\}, \{l_k\}} f = \quad (12)$$
$$\frac{\gamma}{2} \|(\Phi - E - S) \odot M\|_F^2 + |vec\{S \odot M\}|_1 + \frac{\sigma}{2} \sum_n \|\tilde{r}_n - r_n\|^2,$$

$$\text{s.t. } \|\tilde{r}_n - \tilde{r}_{n+1}\| < \epsilon(\lambda),$$

$$\frac{1}{N} \sum_{n=1}^{N} \tilde{r}_n = \frac{1}{N} \sum_{n=1}^{N} r_n,$$

$$\sum_{n=1}^{N} (\tilde{r}_n - \bar{\tilde{r}}) \times (r_n - \bar{r}) = 0,$$

where M is a binary matrix corresponding to the partial observed entries in $\Phi$, in particular, with ones corresponding to the distances between sensors and objects, and zeros elsewhere; $\bar{\tilde{r}}$ and $\bar{r}$ represent the centers of perturbed and ideal sensor locations, respectively. The 2-D vector cross product is defined as follows $$r_1 \times r_2 = (x_1, y_1) \times (x_2, y_2) \triangleq x_1 y_2 - x_2 y_1. \quad (13)$$

In Eq. (12), a robust solution of sensor locations is sought by imposing sparsity on the distance error matrix S. The regularizing term controls how close the perturbed sensors are to their ideal designed locations. Considering that the EDM is invariant with translation, rotation and reflection, constraints of references are added to make sure the solution converges to what is expected in the model. The first constraint requires two neighbor sensors to be close to each other. The second and the third constraints force the center and the orientation of the perturbed sensors are aligned to the ideal designed sensors, respectively.

FIG. 5B is an augmented objective function for ADMM, according to the embodiments of the present disclosure. In order to solve this optimization problem, the objective function is rewritten as an augmented Lagrangian function as follows $$\min L(E, S, \{\tilde{r}_n\}, \{l_k\}, \{\mu_{ij}^e\}, \{\mu_n^\epsilon\}, \mu^c, \mu^o, z_n, \bar{r}, o_n) =$$

-continued $$\frac{\gamma}{2} \|(\Phi - E - S) \odot M\|_F^2 + |vec\{S \odot M\}|_1 +$$

$$\frac{\sigma^r}{2} \sum_n \|\tilde{r}_n - r_n\|^2 + \left( \left\| \bar{r} - \frac{1}{N} \sum_n r_n \right\|^2 \right) + o_{rt}^2 +$$

$$\sum_{ij} \left( -\mu_{ij}^e (E_{ij} - \|\tilde{r}_i - \tilde{r}_j\|^2) + \frac{\sigma_{ij}^e}{2} (E_{ij} - \|\tilde{r}_i - \tilde{r}_j\|^2)^2 \right) +$$

$$\sum_n \left( -\mu_n^\epsilon (\|\tilde{r}_n - \tilde{r}_{n+1}\| + z_n - \epsilon) + \frac{\sigma_n^\epsilon}{2} (\|\tilde{r}_n - \tilde{r}_{n+1}\| + z_n - \epsilon)^2 \right) -$$

$$\mu^c \left( \frac{1}{N} \sum_n \tilde{r}_n - \bar{r} \right) + \frac{\sigma^c}{2} \left( \frac{1}{N} \sum_n \tilde{r}_n - \bar{r} \right)^2 -$$

$$\mu^o \left( \sum_n (\tilde{r}_n - \bar{\tilde{r}}) \times (r_n - \bar{r}) - o_{rt} \right) + \frac{\sigma^o}{2} \left( \sum_n (\tilde{r}_n - \bar{\tilde{r}}) \times (r_n - \bar{r}) - o_{rt} \right)^2$$

FIG. 5C is schematic illustrating of iterative updates of ADMM, minimizing the augmented objective funtion, according to the embodiments of the present disclosure. This minimization problem can be solved by the alternating direction method of multipliers (ADMM), with iterative updates as follows For $m = 1, \ldots, M$ $$E_m = \operatorname{argmin}_E L(E_{m-1}, S_{m-1}, \{\tilde{r}_n\}_{m-1}, \{l_k\}_{m-1}, \{\mu_{ij}^e\}_{m-1})$$

$$S_m = \operatorname{argmin}_S L(E_m, S_{m-1})$$

$$\{\tilde{r}_n\}_m = \operatorname{argmin}_{\{\tilde{r}_n\}} L(E_m, S_m, \{\tilde{r}_n\}_{m-1},$$
$$\{l_k\}_{m-1}, \{\mu_{ij}^e\}_{m-1}, \{\mu_n^\epsilon\}_{m-1}, \mu_{m-1}^c, \mu_{m-1}^o, \{z_n\}_{m-1})$$

$$\{l_k\}_m = \operatorname{argmin}_{\{l_k\}} L(E_m, S_m, \{\tilde{r}_n\}_m, \{l_k\}_{m-1}, \{\mu_{ij}^e\}_{m-1},$$
$$\{\mu_n^\epsilon\}_{m-1}, \mu_{m-1}^c, \mu_{m-1}^o, \{z_n\}_{m-1})$$

$$\{z_n\}_m = \max\left( \frac{\mu^\epsilon}{\sigma^\epsilon} - \|\tilde{r}_n - \tilde{r}_{n+1}\| + \epsilon, 0 \right)$$

$$\{\bar{r}\}_m = \operatorname{argmin}_{\{\tilde{r}_n\}} L(\{\tilde{r}_n\}_m, \bar{r})$$

$$\{o_{rt}\}_m = \operatorname{argmin}_{\{o_{rt}\}} L(\{\tilde{r}_n\}_m, o_{rt})$$

$$\mu_{ij}^e \leftarrow \mu_{ij}^e - \sigma_{ij}^e (E_{ij} - \|\tilde{r}_i - \tilde{r}_j\|^2)$$

$$\mu_n^\epsilon \leftarrow \mu_n^\epsilon - \sigma_n^\epsilon (\|\tilde{r}_n - \tilde{r}_{n+1}\| + z_n - \epsilon)$$

$$\mu^c \leftarrow \mu^c - \sigma^c \left( \frac{1}{N} \sum_n \tilde{r}_n - \bar{r} \right)$$

$$\mu^o \leftarrow \mu^o - \sigma^o \left( \sum_n (\tilde{r}_n - \bar{\tilde{r}}) \times (r_n - \bar{r}) - o_{rt} \right).$$

Figure 5D:
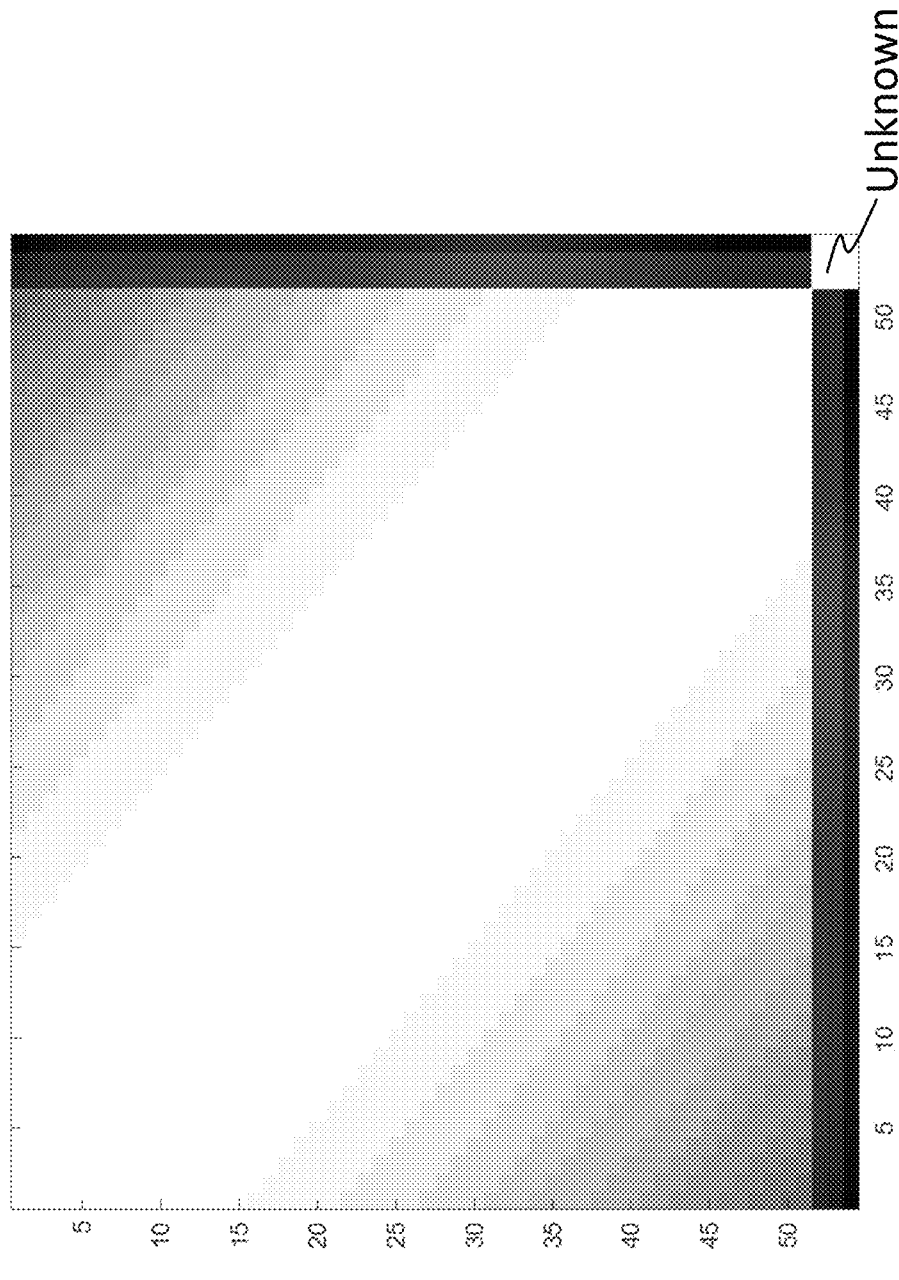
FIG. 5D is schematic illustrating of intial partial observed noisy EDM, according to the embodiments of the present disclosure.
Figure 5F:
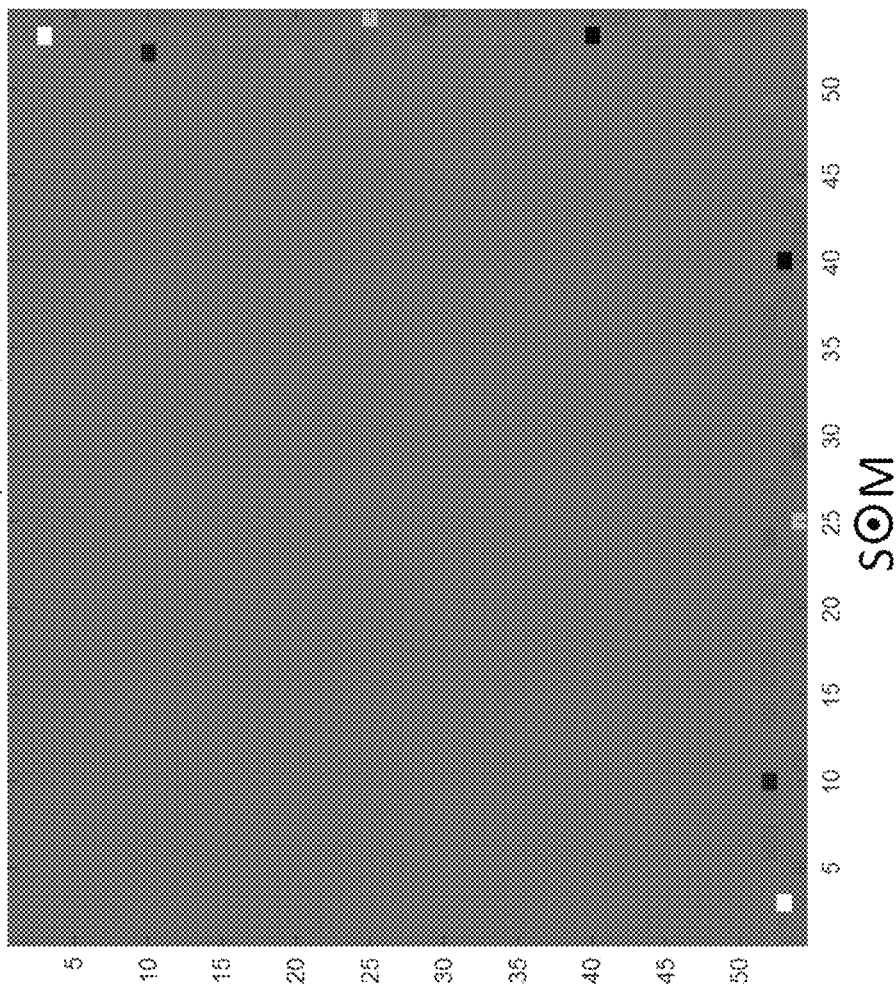
FIG. 5F is schematic illustrating of sparse error of recovered EDM, according to the embodiments of the present disclosure.
Figure 5G:
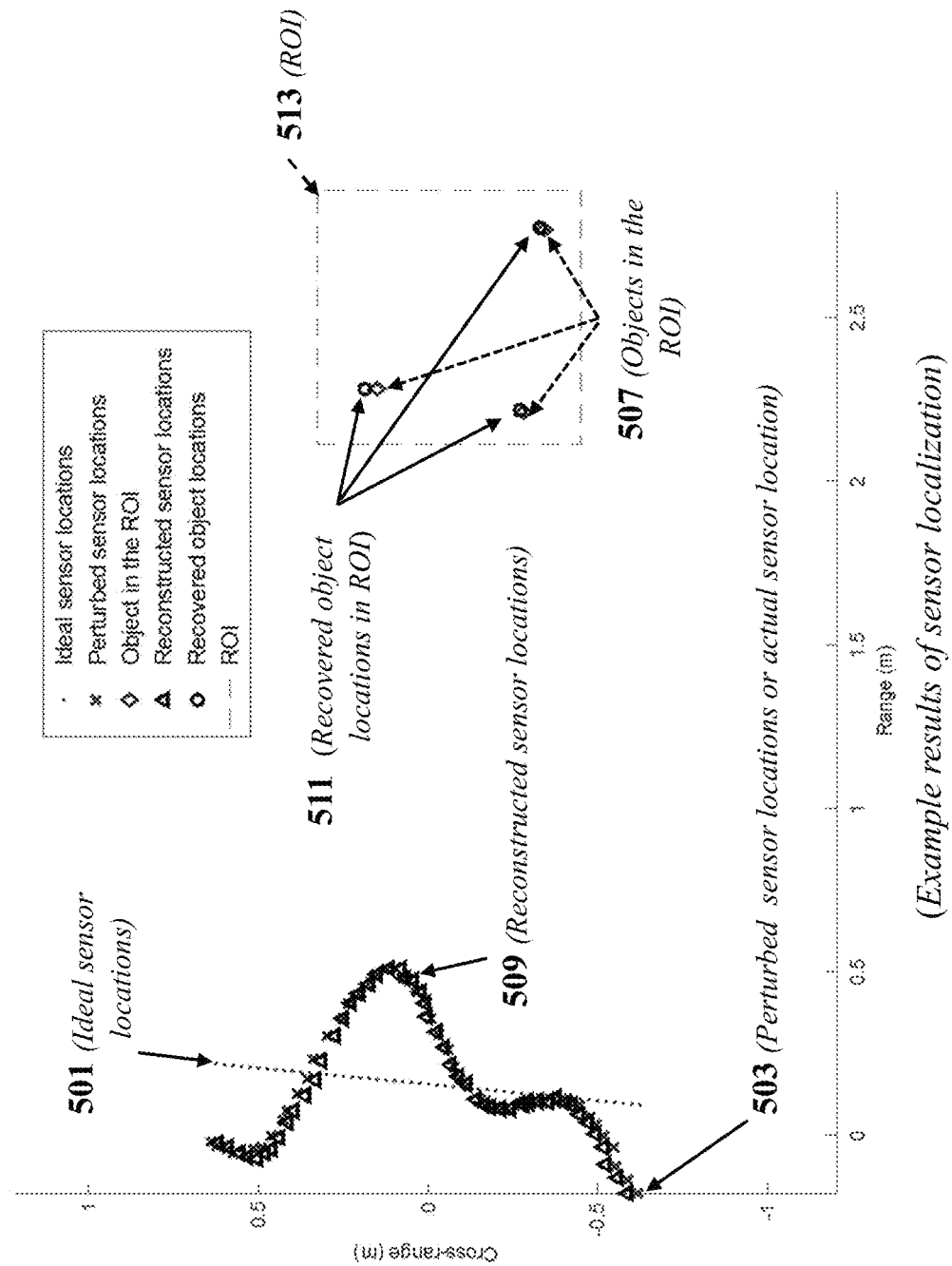
FIG. 5G is schematic illustrating of recovered sensor locations of a method of the present disclosure, which is compared to results using a least squares method of FIG. 5H, according to the embodiments of the present disclosure.

Referring to FIG. 5D, FIG. 5E, FIG. 5F, FIG. 5G and FIG. 5H, wherein FIG. 5D is schematic illustrating of initial partial observed noisy EDM, according to the embodiments of the present disclosure. FIG. 5E is schematic illustrating of recovered EDM using ADMM, according to the embodiments of the present disclosure. FIG. 5F is schematic illustrating of sparse error of recovered EDM, according to the embodiments of the present disclosure. FIG. 5G is schematic illustrating of recovered sensor locations, and comparison to the result using the least squares method, according to the embodiments of the present disclosure. FIG. 5H is schematic illustrating of radar imaging results using inaccurate sensor locations and using estimated sensor locations respectively, according to the embodiments of the present disclosure.

Referring to FIG. 5G and FIG. 4B, in order to verify the method of the present disclosure, a total of N=51 sensors are used to image K=3 static objects in the ROI. The distributed sensors/antennas are designed to form a uniform linear array as indicated by the dots 501 in FIG. 5G. However, the actual element locations are perturbed, as indicated by the black x-marks 503 in FIG. 5G, with up to 10 times the center wavelength of the transmitted source signal. The time-domain source pulse 120 of FIG. 4B as is illustrated in FIG. 4B, and the received echoes 130 of FIG. 4B are simulated using the free-space Green's function with added white Gaussian noise, as shown in FIG. 4B. Noted is that FIG. 5G and FIG. 5H show the ideal sensor locations 501, the perturbed sensor locations as x-marks 503, the objects in the ROI as diamond shaped marks 507, the reconstructed sensor locations as triangle shaped marks 509, the recovered object locations as circle shaped marks 511 and the ROI 513.

Referring to FIG. 5D, FIG. 5E, FIG. 5F, FIG. 5G and FIG. 5H, the sensor localization method of the present disclosure, includes that an EDM is first estimated using measured signals and prior information about sensor locations, as shown in FIG. 5D. By solving the optimization problem in Eq. (12), an underlying low-rank EDM is recovered, as shown in FIG. 5E with sparse error components shown in FIG. 5F. The corresponding recovered sensor and object locations are shown in FIG. 5G, which are very well aligned with the true perturbed sensor and object locations. However, if the least squares method is usesd to estimate sensor locations, some of the sensor locations exhibit errors much larger than the source wavelength, as shown in FIG. 5H.

Figure 5I:
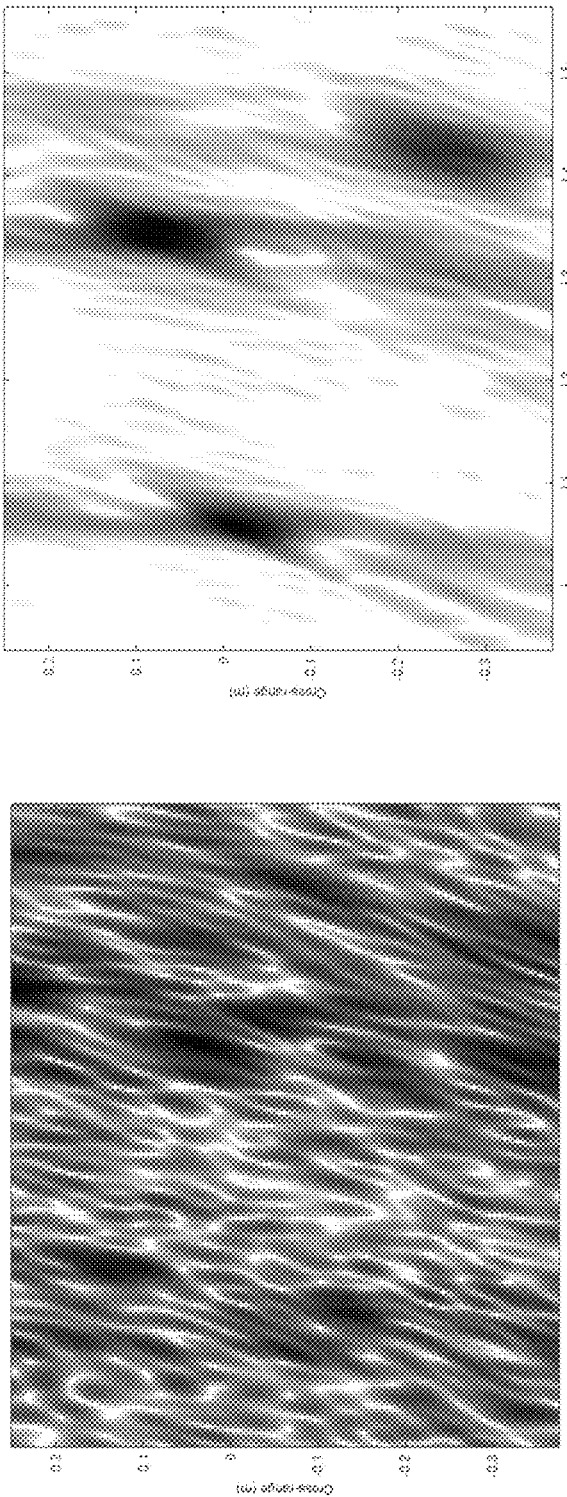
FIG. 5I is schematic illustrating of radar imaging results using inaccurate sensor locations and using estimated sensor locations respectively, according to the embodiments of the present disclosure.

FIG. 5I is schematic illustrating of radar imaging results using inaccurate sensor locations and using estimated sensor locations respectively, according to the embodiments of the present disclosure. For example, the radar imaging results are using inaccurate sensor locations and estimated sensor locations, repectively.

Features

According to aspects of the present disclosure, wherein the received signal data includes measurements determining a phase change of a received echo relative to the transmitted source signal which indicates a distance between each sensor and a corresponding target. Further an aspect can include the set of sensors having at least three sensors, such that the at least three sensors are moving, stationary, or some combination thereof, and each sensor includes a motion error up to 10× wavelengths. Further still, an aspect can include the source signal is a wide-band source signal, such that a phase change is indicated by a time shift between the source signal and a received echo, wherein the time shift is estimated based on computing a cross-correlation (CC) between two time-domain signals, or computed equivalently in a frequency domain.

According to aspects of the present disclosure, the errors for the noisy and the partial EDM include spike errors caused by mis-alignment of targets, as well as approximation errors. It is possible that an aspect can include the set of sensors are moving along a predesigned trajectory to detect the targets, and wherein the targets are stationary. Further still, an aspect can include the constrained optimization process being solved using an alternating direction method of multipliers (ADMM).

According to aspects of the present disclosure, is that each antenna in the set of antennas can be at a different position in relation to the ROI or some antennas in the set of antennas are at different positions in relation to the ROI. Further, some antennas of the set of antennas can transmit radar pulses to the ROI and measure a set of reflections from the ROI.

Figure 6:
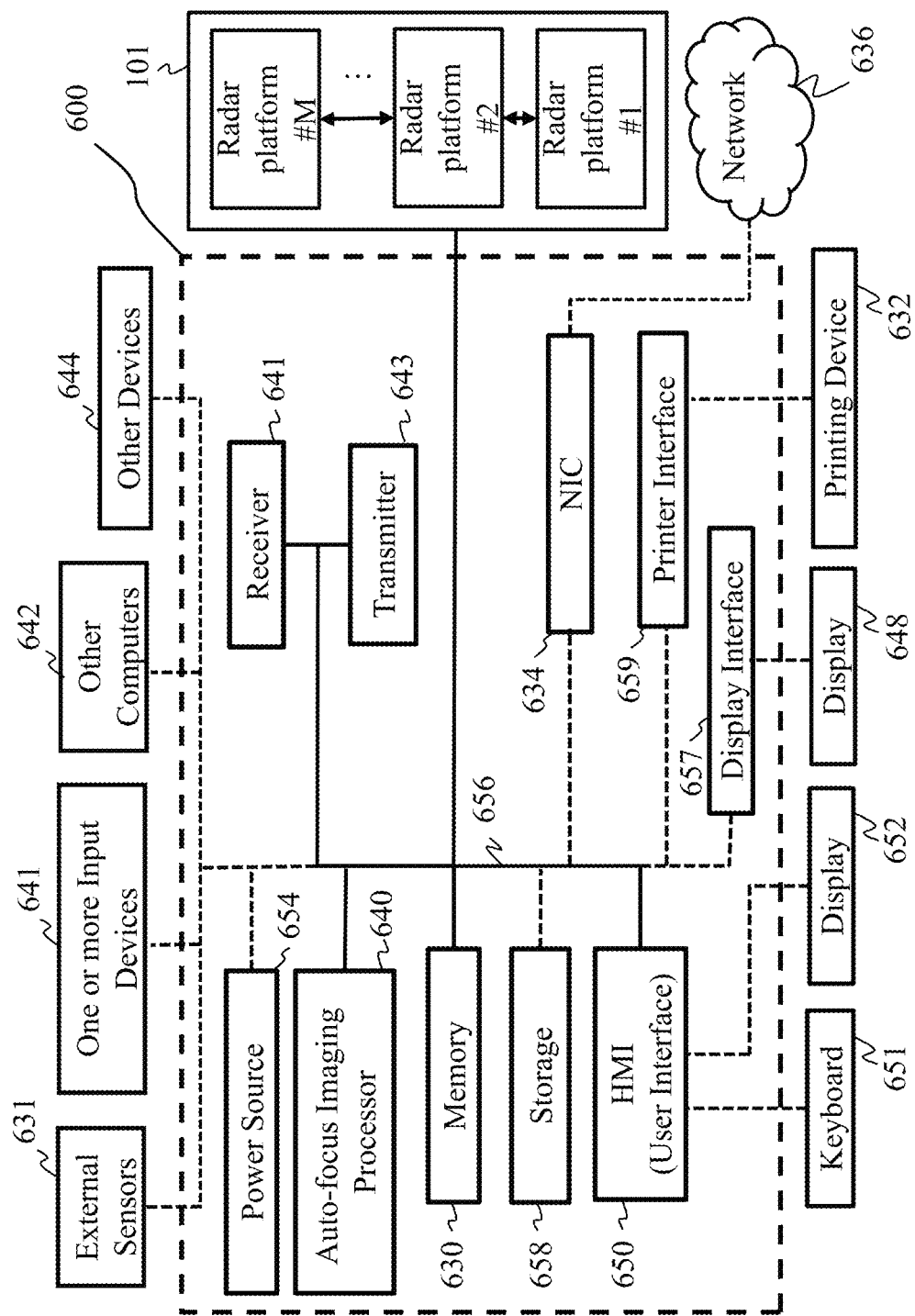
FIG. 6 is a block diagram of a computer system of the distributed radar imaging system contemplated by the present disclosure, in accordance with some embodiments of the present disclosure.

FIG. 6 is a block diagram of a computer system of the distributed radar imaging system contemplated by the present disclosure, in accordance with some embodiments of the present disclosure. The computer system 600 is in communication with the synchronized radar platforms 101 and can store the collected data in the memory 630 that is processed by the auto-focus imaging processor 640 of the computer 600. The computer system 600 includes a human machine interface or user interface 650 that can connect the computer system to a keyboard 651 and display device 652. The computer system 600 can be linked through the bus 656 to a display interface 657 adapted to connect the system 600 to a display device 648, wherein the display device 648 can include a computer monitor, camera, television, projector, or mobile device, among others.

The computer system 600 can include a power source 654, depending upon the application the power source may be optionally located outside of the computer system. The auto-focus imaging processor 640 maybe one or more processors that can be configured to execute stored instructions, as well as be in communication with the memory 630 that stores instructions that are executable by the auto-focus imaging processor 640. The auto-focus imaging processor 640 can be a single core processor, a multi-core processor, a computing cluster, or any number of other configurations. The auto-focus imaging processor 640 is connected through a bus 656 to one or more input and output devices. The memory 630 can include random access memory (RAM), read only memory (ROM), flash memory, or any other suitable memory systems.

Still referring to FIG. 6, the computer system 600 can also include a storage device 658 adapted to store supplementary data and/or software modules used by the auto-focus imaging processor 640. For example, the storage device 658 can store historical data relating to predesigned radar platform trajectories, radar operating frequency bandwidth, transmitted waveform, estimated signal-to-noise ratio, image data relating to target recognition, imaging results using simulated noisy data with different methods dealing with position errors, among other things. The storage device 658 can include a hard drive, an optical drive, a thumb-drive, an array of drives, or any combinations thereof.

Still referring to FIG. 6, a printer interface 659 can also be connected to the computer system 600 through the bus 656 and adapted to connect the computer system 600 to a printing device 632, wherein the printing device 632 can include a liquid inkjet printer, solid ink printer, large-scale commercial printer, thermal printer, UV printer, or dye-sublimation printer, among others. A network interface controller (NIC) 634 is adapted to connect the computer system 600 through the bus 656 to a network 636. The image data or related image data, among other things, can be rendered on a display device, imaging device, and/or printing device via the network 636.

Still referring to FIG. 6, the image data or related image data, among other things, can be transmitted over a communication channel of the network 636, and/or stored within the computer's storage system 658 for storage and/or further processing. Further, the image data or related image data may be received wirelessly or wire from a receiver 641 or transmitted via a transmitter 643 wirelessly or wire, the receiver 641 and transmitter 643 are both connected to the computer system 600 through the bus 656.

The computer system 600 may be connected to external sensors 631, one or more input devices 641, other computers 642 and other devices 644. The external sensors 631 may include motion sensors, inertial sensors, a type of measuring sensor, etc. The external sensors 631 may include sensors for, speed, direction, air flow, distance to an object or location, weather conditions, etc. The input devices 641 can include, for example, a keyboard, a scanner, a microphone, a stylus, a touch sensitive pad or display.

Embodiments

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims. Specific details are given in the following description to provide a thorough understanding of the embodiments. However, understood by one of ordinary skill in the art can be that the embodiments may be practiced without these specific details.

For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements. Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet. The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A radar system to produce a radar image of a region of interest (ROI), wherein the ROI includes targets, comprising:
    sensors at different positions to transmit source signals to the ROI and to measure echoes reflected back from the targets corresponding to the transmitted source signals, such that each sensor includes received signal data including echoes of target measurements specific to the sensor;
    a hardware processor is configured to
        calculate an estimate of a noisy and a partial Euclidean Distance Matrix (EDM) of the sensors and the targets, based on the received signal data, wherein Euclidean distances between the sensors are computed using expected sensor locations, and the Euclidean distances between the sensors and the targets are estimated by correlating the received signal data for each sensor, wherein the noisy and the partial EDM includes distance errors;
        decompose the noisy and the partial EDM into a low rank EDM that corresponds to locations to actual sensors and target locations, and a sparse matrix of distance errors, using a constrained optimization process comprising minimizing a constrained cost function for robust sensor localization, wherein the low rank EDM is mapped into the sensors and the targets locations, to obtain estimated actual sensor locations; and
        implement an inverse imaging process using the estimated actual sensor locations and the received signal data, to produce the radar image; and
    an output interface to output the radar image to a communication channel.

2. The radar system of claim 1, wherein the received signal data includes measurements determining a phase change of a received echo relative to the transmitted source signal which indicates a distance between each sensor and a corresponding target.

3. The radar system of claim 1, wherein the transmitted source signal is a wide-band source signal, such that a phase change of a received echo relative to the transmitted source signal is indicated by a time shift between the source signal and a received echo, wherein the time shift is estimated based on computing a cross-correlation (CC) between two time-domain signals, or computed equivalently in a frequency domain.

4. The radar system of claim 1, wherein the constrained optimization process is solved using an alternating direction method of multipliers (ADMM).

5. The radar system of claim 1, wherein the sensors are at least three sensors, such that the at least three sensors are moving, stationary, or some combination thereof, and each sensor includes a motion error up to 10× wavelengths.

6. The radar system of claim 1, wherein the errors for the noisy and the partial EDM include spike errors caused by mis-alignment of targets, as well as approximation errors.

7. The radar system of claim 1, wherein the sensors are moving along a predesigned trajectory to detect the targets, and wherein the targets are stationary.

8. The radar system of claim 1, wherein each sensor includes an antenna, such that each sensor is at a different position in relation to the ROI than all other sensors or some sensors are at different positions in relation to the ROI than at least one other sensor.

9. The radar system of claim 8, wherein at least one antenna transmits radar pulses to the ROI and measures a set of reflections back from the ROI.

10. A method for producing a radar image of a region of interest (ROI), wherein the ROI includes targets, comprising:
    using sensors at different positions to transmit source signals to the ROI and measuring echoes reflected back from the targets corresponding to the transmitted source signals, such that each sensor includes received signal data including echoes of target measurements specific to the sensor;
    using a hardware processor configured for
        calculating an estimate of a noisy and a partial Euclidean Distance Matrix (EDM) of the sensors and the targets, based on the received signal data, wherein Euclidean distances between the sensors are computed using expected sensor locations, and the Euclidean distances between the sensors and the targets are estimated by correlating the received signal data for each sensor, wherein the noisy and the partial EDM includes distance errors;
        decomposing the noisy and the partial EDM into a low rank EDM that corresponds to locations to actual sensors and target locations, and a sparse matrix of distance errors, using a constrained optimization process, comprising minimizing a constrained cost function for robust sensor localization, wherein the low rank EDM is mapped into the sensors and the targets locations, to obtain estimated actual sensor locations; and
        implementing an inverse imaging process using the estimated actual sensor locations and the received signal data, to produce the radar image; and
    outputting via an output interface the radar image to a communication channel.

11. The method of claim 10, further comprising storing the received signal data in a memory of each sensor, such that the received signal data includes measurements determining a phase change of a received echo relative to the transmitted source signal which indicates a distance between each sensor and a corresponding target.

12. The method of claim 10, wherein solving the constrained optimization process includes using an alternating direction method of multipliers (ADMM).

13. The method of claim 10, wherein a wide-band source signal as the source signal, such that a phase change of a received echo relative to the transmitted source signal is indicated by a time shift between the source signal and a received echo, wherein the time shift is estimated based on computing a cross-correlation (CC) between two time-domain signals, or computed equivalently in a frequency domain.

14. The method of claim 10, wherein the errors for the noisy and the partial EDM include spike errors caused by mis-alignment of targets, as well as approximation errors.

15. The method of claim 10, wherein the sensors are at least three sensors, such that the at least three sensors are moving, stationary, or some combination thereof, and each sensor includes a motion error up to 10× wavelengths.

16. The method of claim 10, wherein each sensor includes an antenna, such that each sensor is at a different position in relation to the ROI than all other sensors or some sensors are at different positions in relation to the ROI than at least one other sensor.

17. The method of claim 16, wherein at least one antenna transmits radar pulses to the ROI and measures a set of reflections back from the ROI.

18. A non-transitory computer readable memory embodied thereon a program executable by a processor for performing a method, the method comprising:

acquiring echoes reflected back from targets in the ROI corresponding to transmitted source signals from sensors at different positions in relation to the ROI, wherein each sensor includes received signal data including the echoes of target measurements specific to the sensor;

providing a hardware processor for
calculating an estimate of a noisy and a partial Euclidean Distance Matrix (EDM) of the sensors and the targets, based on the received signal data, wherein Euclidean distances between the sensors are computed using expected sensor locations, and the Euclidean distances between the sensors and the targets are estimated by correlating the received signal data for each sensor, wherein the noisy and the partial EDM includes distance errors;

decomposing the noisy and the partial EDM into a low rank EDM that corresponds to locations to actual sensors and target locations, and a sparse matrix of distance errors, using a constrained optimization process comprising minimizing a constrained cost function for robust sensor localization, wherein the low rank EDM is mapped into the sensors and the targets locations, to obtain estimated actual sensor locations; and implementing an inverse imaging process using the estimated actual sensor locations and the received signal data, to produce the radar image; and outputting via an output interface the radar image to a communication channel, so as to provide a focused radar image in order to obtain information from the radar image.

19. The non-transitory computer readable memory of claim 18, wherein the received signal data includes measurements determining a phase change of a received echo relative to the transmitted source signal which indicates a distance between each sensor and a corresponding target, and wherein solving the constrained optimization process includes using an alternating direction method of multipliers (ADMM).

20. The non-transitory computer readable memory of claim 18, wherein a wide-band source signal as the source signal, such that a phase change of a received echo relative to the transmitted source signal is indicated by a time shift between the source signal and a received echo, and wherein the time shift is estimated based on computing a cross-correlation (CC) between two time-domain signals, or computed equivalently in a frequency domain.

* * * * *